US 9,574,550 B2

(12) United States Patent
Fyfe

(10) Patent No.: US 9,574,550 B2
(45) Date of Patent: Feb. 21, 2017

(54) SUPPORT STRUCTURE FOR AN OFFSHORE WIND TURBINE

(76) Inventor: Alexander John Fyfe, Middlesex (GB)

( * ) Notice: Subject to any disclaimer, the term of this patent is extended or adjusted under 35 U.S.C. 154(b) by 858 days.

(21) Appl. No.: 13/811,742

(22) PCT Filed: Jul. 22, 2011

(86) PCT No.: PCT/GB2011/001101
§ 371 (c)(1),
(2), (4) Date: Apr. 3, 2013

(87) PCT Pub. No.: WO2012/010847
PCT Pub. Date: Jan. 26, 2012

(65) Prior Publication Data
US 2013/0183163 A1 Jul. 18, 2013

(30) Foreign Application Priority Data
Jul. 23, 2010 (GB) .................................. 1012421.2

(51) Int. Cl.
| B63H 1/28 | (2006.01) |
| F03D 11/04 | (2006.01) |
| E02D 27/42 | (2006.01) |
| B63B 35/44 | (2006.01) |
| B63B 5/14 | (2006.01) |
| B63B 21/50 | (2006.01) |

(52) U.S. Cl.
CPC ............. *F03D 11/045* (2013.01); *B63B 5/14* (2013.01); *B63B 21/502* (2013.01); *B63B 35/44* (2013.01); *E02D 27/42* (2013.01); *F03D 13/22* (2016.05); *F03D 13/25* (2016.05); *B63B 2035/446* (2013.01); *F05B 2240/93* (2013.01); *F05B 2240/95* (2013.01); *Y02E 10/727* (2013.01)

(58) Field of Classification Search
CPC .... F03D 11/04; F03D 11/045; F05B 2240/90; F05B 2240/93; F05B 2240/95; F05B 2240/97; F05B 2240/912
See application file for complete search history.

(56) References Cited

U.S. PATENT DOCUMENTS

| 8,197,208 B2* | 6/2012 | Sharples | ............... F03D 1/0608 415/7 |
| 8,613,569 B2* | 12/2013 | Belinsky | ............... F03D 11/045 405/203 |
| 2006/0062676 A1* | 3/2006 | Jakubowski | ......... A01K 61/007 416/244 R |

FOREIGN PATENT DOCUMENTS

| DE | 103 57 392 A1 | 4/2005 |
| GB | 2459172 A | 10/2009 |

(Continued)

OTHER PUBLICATIONS

Written Opinion and International Search Report for corresponding PCT/GB2011/001101, mailed Dec. 6, 2011, in 10 pages.

(Continued)

*Primary Examiner* — Thomas Denion
*Assistant Examiner* — Matthew T Largi
(74) *Attorney, Agent, or Firm* — Procopio, Cory, Hargreaves & Savitch LLP

(57) ABSTRACT

A support structure for mooring a vertically extending floating wind turbine or the like body has a ring of tether attachment points for connecting respective tethers running down to the seabed. The ring is spaced from the body by a ring of inclined struts running diagonally downwardly and inwardly from the plane of the attachment points.

13 Claims, 5 Drawing Sheets

(56) References Cited

FOREIGN PATENT DOCUMENTS

| WO | 2008/122004 A2 | 10/2008 | | |
|---|---|---|---|---|
| WO | 2009/050547 A2 | 4/2009 | | |
| WO | WO 2009050547 A2 * | 4/2009 | ............ | E02D 27/42 |
| WO | 2009/064737 A1 | 5/2009 | | |
| WO | 2010/048560 A2 | 4/2010 | | |
| WO | WO 2010048560 A2 * | 4/2010 | ............ | B63B 35/44 |

OTHER PUBLICATIONS

Combined Search and Examination Report under Sections 17 and 18(3) for related GB 1012421.2, dated Oct. 28, 2010, in 5 pages.

* cited by examiner

SUPPORT STRUCTURE FOR AN OFFSHORE WIND TURBINE

BACKGROUND ART

This invention relates to tension leg moored structures and particularly, though not exclusively, to offshore wind turbine structures. Tension leg moored oil platforms are known, and it has been proposed to use tension leg moored structures for supporting wind turbines. Examples are disclosed in GB2365905, DE10101405, WO2008/122004, WO2009/064737 and WO2004/61302.

Such structures comprise a floating surface element moored to the sea floor by tethers. They allow operation in deeper waters (for example they are used at more than 200 meters in depth) than would be feasible using a rigid platform.

Particularly acute problems arise when seeking to stably anchor tall and narrow columnar upright floating structures such as wind turbines. In such structures, the wind turbine vertical shaft (supporting either a horizontal axle turbine mounted at its upper end or a vertical axle wind turbine around it) has a floating body centred around it, with (typically six or eight) radial outrigger arms at its lower end, beneath sea level. The outrigger arms are typically horizontal. The outer ends of the radial outrigger arms are interconnected by a horizontal ring of struts so as to provide rigidity to the outriggers against out-of-plane loading. Rising diagonally upwardly and inwardly from the outer ends of the radial outrigger arms are respective diagonal spars which meet the central vertical shaft. The outrigger structure thus provides a rigid upper connection platform from which a plurality of tethers (typically one coupled to each outrigger arm for eight or more outriggers; two, three or more per arm for fewer outriggers) run down to anchor points on the sea bed. Each diagonal spar thus lies on the hypotenuse of a right-angled triangle with a horizontal base provided by the outrigger arm and a vertical side provided by the centre axis of the wind turbine. The diagonal spars are maintained in tension by the downward force exerted by the tethers on the outrigger arms and the upward force exerted by buoyancy on the central body.

The tethers are below surface level. The tether top connection points define a surface centrally within which is the centroid of the forces acting on the tethers. When they are accurately aligned, the buoyancy of the floating body tensions all tethers equally. A change in depth of the surface structure varies the tension in the tethers equally. A horizontal force in the plane of the tether centroid increases the tension in all tethers equally. An overturning moment about the tether centroid on the outrigger structure increases the tension in some tethers and reduces it in others. If the tension in a tether is reduced to zero, it goes slack and tends to be subject to high dynamic snatch loads when re-tensioned.

PROBLEMS WITH THE PRIOR ART

The present invention is intended to increase the stability and reliability of the tethered leg mooring structure. The present inventors have studied the problems arising from use of a tension leg platform for wind turbines particularly in depths of 60-70 meters. The traditional structure described above was found to be very sensitive to minor changes in configuration and wind, wave and current parameters. For such relatively tall and narrow floating structures, there are four important contributions to the total load:

1. Wind load on the blades. Since this acts at the hub of the turbine (for a horizontal axis wind turbine), above sea level (and hence the tether centroid) by at least the height of the blades, it creates a large turning moment about a horizontal axis;
2. Wave loads on the central tower. Again, these forces act above the tether centroid and hence cause an overturning moment, usually in a similar direction to the wind load.
3. Inertial loads. As the hull is pushed backwards and forwards by the waves it generates inertial loads acting around the combined centre of mass and "added mass" (i.e. the mass of surrounding water which moves with the hull), which usually lies above the tether centroid and hence creates another turning moment, often acting in the same direction as the first two.
4. Current loads. These will also typically act above the tether centroid, and hence create a moment which, for co-directional waves and currents, is additive to that created by the waves.

The present inventors have found it difficult to select a satisfactory height of the tether tops (i.e. the tether centroid) while ensuring a satisfactory upper attachment of the outrigger arms to the central column lying below the wave zone. Generally, increasing the displacement size of the surface structure increases its buoyancy and hence the static tension in all tethers, and therefore reduces the likelihood of one of them slackening, but leads to larger wave loading on the larger floating body and hence increases the dynamic load components of forces on the tether. Mounting the outrigger arms lower on the floating body shortens the tether length and hence, in less deep waters, the tethers absorb a larger range of dynamic loads as each wave passes over a shorter tether length, increasing the tensile stress range in the tethers. Generally, it is desirable to make the tether lengths sufficiently long to allow the structure to move with cyclic components of wave loading, and not merely to resist the wave loads by passing these high loads to the tethers.

SUMMARY OF THE INVENTION

The invention overcomes some or all of these problems and provides a more stable and reliable tethered leg platform design, preferably for an offshore wind turbine, by providing a structure for mooring a vertically extending floating central body comprising a columnar hollow tubular flotation chamber, providing a plurality of attachment points spaced radially outwardly from said body for tensioned mooring tethers, comprising: an outrigger structure extending radially from said body, and an inclined bracing structure running from the distal part of the outrigger structure to connect with said floating body, in which; said inclined bracing structure runs diagonally downwardly and inwardly from the plane of said attachment points, and the proximal part of said inclined bracing structure joins said floating body around its lower end.

The invention also relates to a method of operating a wind turbine comprising mounting said offshore wind turbine atop a floating body tethered to the floor of a body of water by a plurality of tethers, each attached to a respective attachment point radially spaced around said floating body and provided by an outrigger structure extending substantially horizontally and loaded normally in tension by said tethers, and braced by a bracing structure running diagonally outwardly and upwardly and loaded normally in compression by said tethers.

This raises the tether centroid (i.e. the level of the upper tether attachment points) to a point well above the base of the central body. The tether centroid and outrigger structure can still be positioned well below the bottom of the trough of the highest expected waves. By raising the plane of the tether terminations, all of the above overturning moments are reduced, and some can even be reversed. These and other advantages and effects of the invention are disclosed in greater detail below.

BRIEF DESCRIPTION OF THE DRAWINGS

Embodiments of the invention will now be described by way of example only with reference to the accompanying drawings in which.

DESCRIPTION OF PRIOR ART

Figure 1:
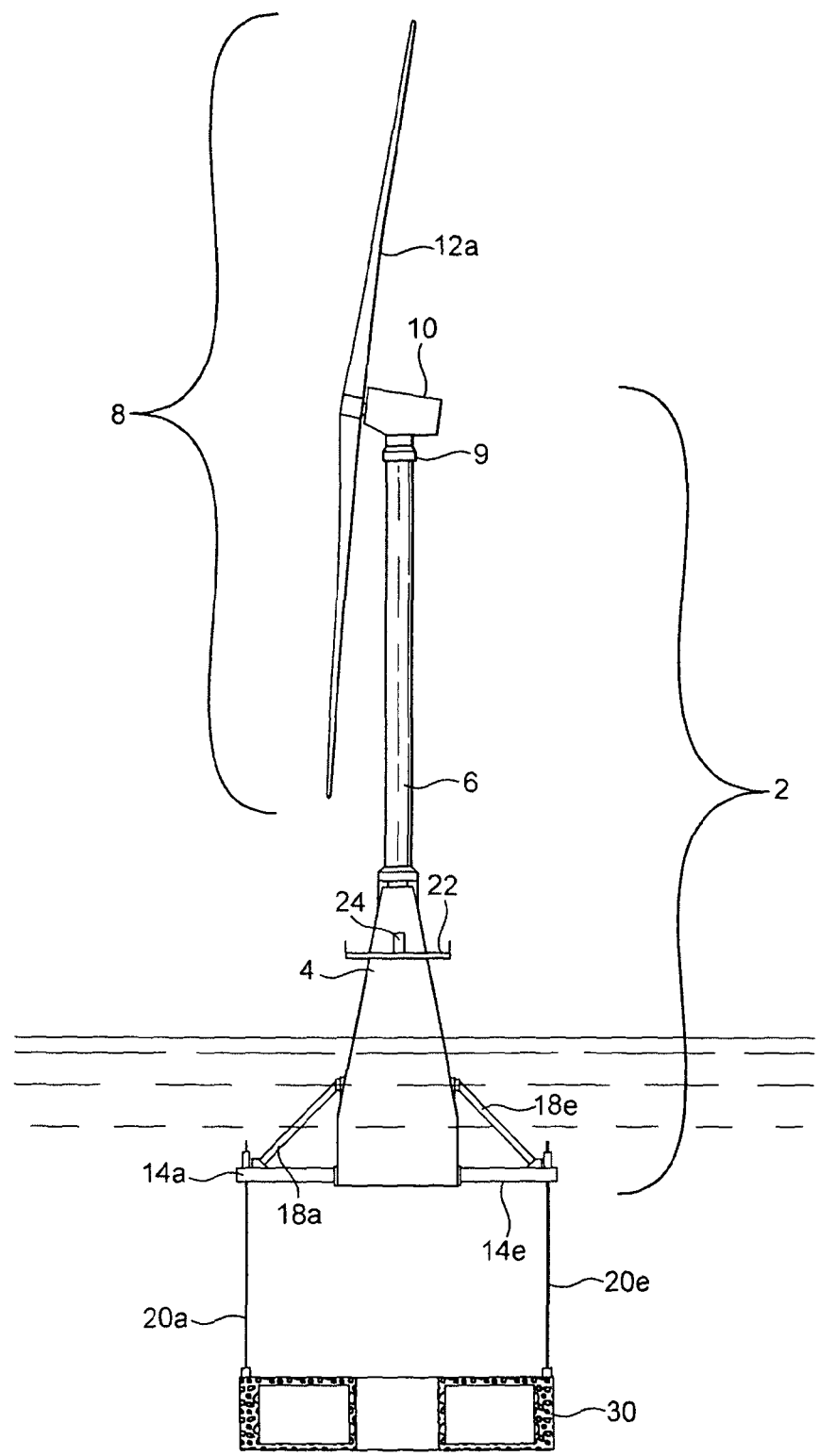
FIG. 1 is a side elevation of an offshore wind turbine of conventional design supported by a tension leg structure of the prior art.

The prior art structure shown in FIG. 1 consists of a body 2 comprising a substantially hollow frusto-conical concrete float 4 with a cylindrical tubular steel columnar upper section 6 of diameter 4 meters connected thereto. Mounted atop the upper section 6 is a horizontal axle wind turbine 8 comprising a nacelle 10 carrying a plurality of blades 12a, 12b . . . , together with associated gear train, electrical generator and other conventional components (not shown); such turbines are readily commercially available and require no further description. The height of the hub of the nacelle of the wind turbine above normal sea level (the level shown in the Figure) is around 93 meters, of which 87 meters is the steel upper section 6; the hub is about 6 m above a yaw housing 9 atop the column. The bottom of the float 4 lies 22.5 meters below sea level, and the float is 20 meters in diameter at its base, narrowing to the same diameter as the upper section at the concrete/steel joint between the two. Twelve meters above sea level is a working floor provided by a steel platform 22 to which boats or barges can moor, and from which opens a door 24 to the interior of the body 2 allowing maintenance access.

Eight steel outrigger arms 14a-14h run radially in a cross from connections on the base of the concrete float outwards to a length of 15 meters. Their outer (distal) ends are joined by eight horizontal, circumferential steel braces 16a-16h forming a horizontal octagon 50 meters in diagonal diameter. Running diagonally upwards and inwards from their outer ends are eight respective diagonal steel tie rods 18a-18h. The tie rods 18 connect at their upper ends to the concrete float, 15 meters above the level of the outrigger arms 14. The outriggers therefore each constitute a propped cantilever, the arms being the cantilevers and the tie rods the props.

The upper ends of tethers 20a-20h are connected in use (e.g. via hydraulic jacks) to the distal ends of the outrigger arms which make up the eight corners of the octagonal steel support structure. The lower ends of the tethers 20a-20h are connected, at a depth of for example 60-70 meters, to an anchoring structure 30 on the sea bed. The anchoring structure 30 typically comprises a hollow counterweight, sunk by allowing ingress of water or ballasted with gravel or dense sand.

As noted above, the structure has the attachment points to the tethers (defining the tether centroid) relatively low, just above the base of the float 4. The tethers 20 are normally under tension from the buoyancy of the float 4 and hence apply tensile force to the diagonal tie rods 18, and compressive force to the outrigger arms 14. As the structure is moved by currents, waves and wind, the tensions on the tethers vary through a wide dynamic range.

First Embodiment

Figure 2:
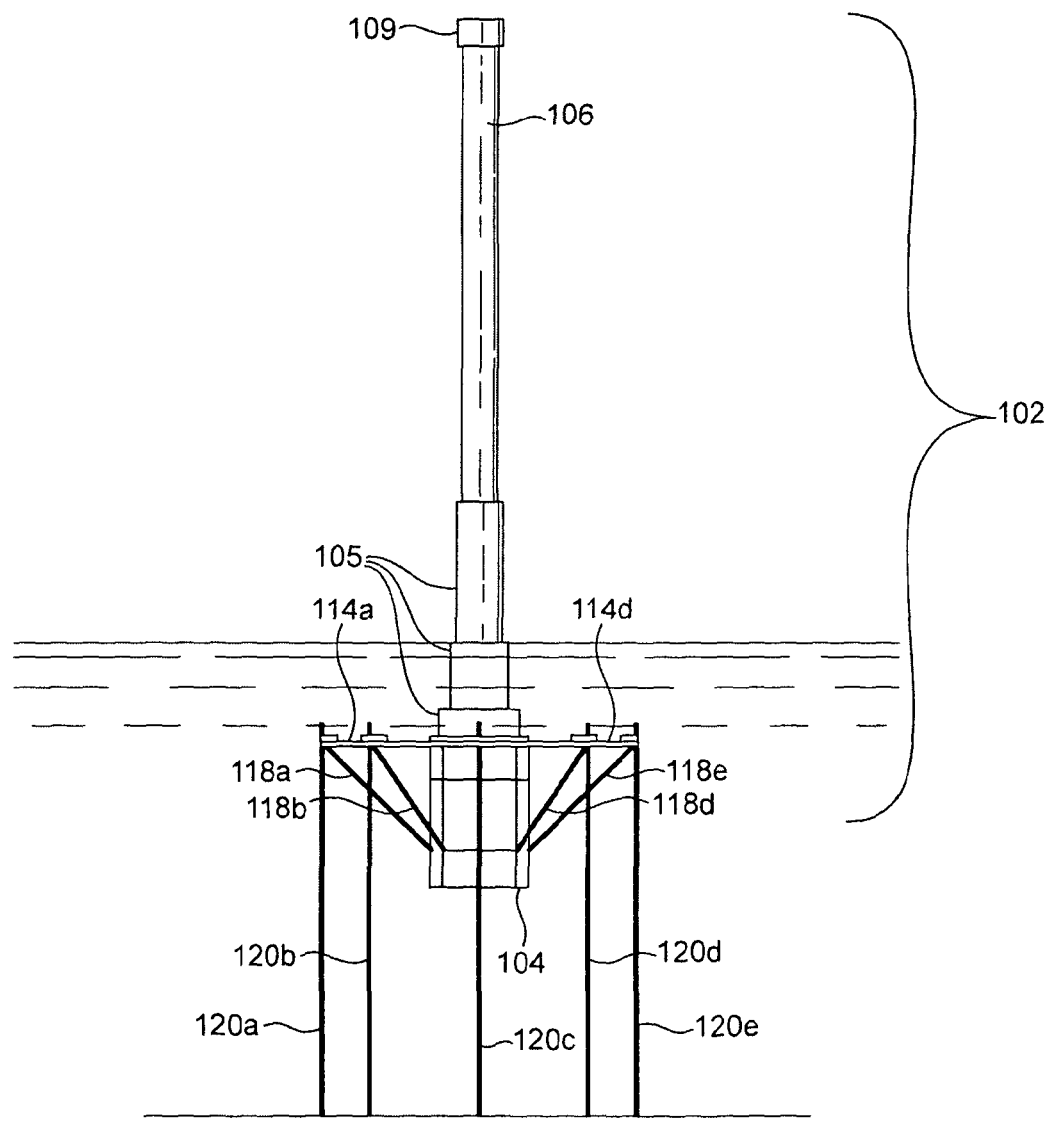
FIG. 2 is a side elevation of a first embodiment.

Referring to FIG. 2, in a first embodiment a central body 102 of hollow steel construction comprises a lower axial cylindrical tubular float 104 surmounted by a group of upper coaxial cylindrical tubular sections 105 on top of which is a coaxial cylindrical tubular tower 106 of smaller cross-section (atop which is a yaw housing 109 carrying a conventional wind turbine) having a working floor with access door (corresponding to those of FIG. 1 and therefore omitted for reasons of space).

Connected to and evenly radially spaced around the central float body 102 are eight horizontal steel outrigger arms 114a-114h, the distal ends of which are interconnected by a ring of horizontal steel braces 116a-116h. Each carries a connection to the upper end of a respective flexible steel tether 120a-120h running down to a counterweight on the seafloor (not shown). Running downwardly and inwardly from each of the distal ends of the outrigger arms are respective bracing struts 118a-118h. These elements differ from their counterparts in FIG. 1 in that the tethers act to pull the bracing struts 118 downwards and therefore maintain them in compression, and the outrigger arms 114 in tension. The diagonal bracing struts are therefore broader and shaped to resist buckling.

The connection points of the tethers are now considerably higher in the water than in FIG. 1, and the centre of gravity of the entire structure and wind turbine is closer to the plane defined by the upper ends of the tethers. Thus, as discussed in greater detail below, the moments acting on the structure are smaller. Further, the tethers are longer and they allow the structure to deflect further under the cyclic action of the waves and reduce the portion of the wave load that is taken directly by the tethers. The extensions on the tethers are taken over a greater length so that, for the same tether diameter and lateral displacement, the strains are lower.

Second Embodiment

Figure 3:
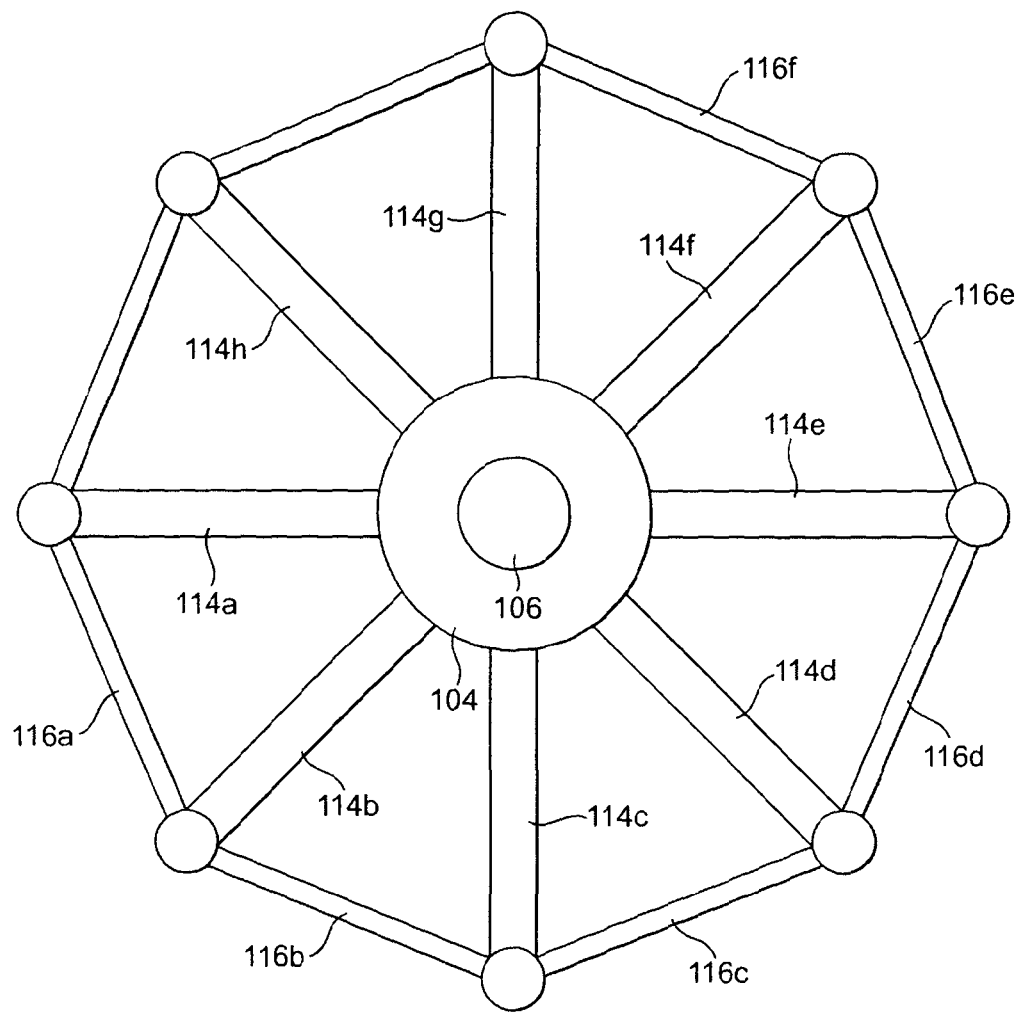
FIG. 3 is a plan view of a tension leg support structure of a second embodiment.
Figure 4:
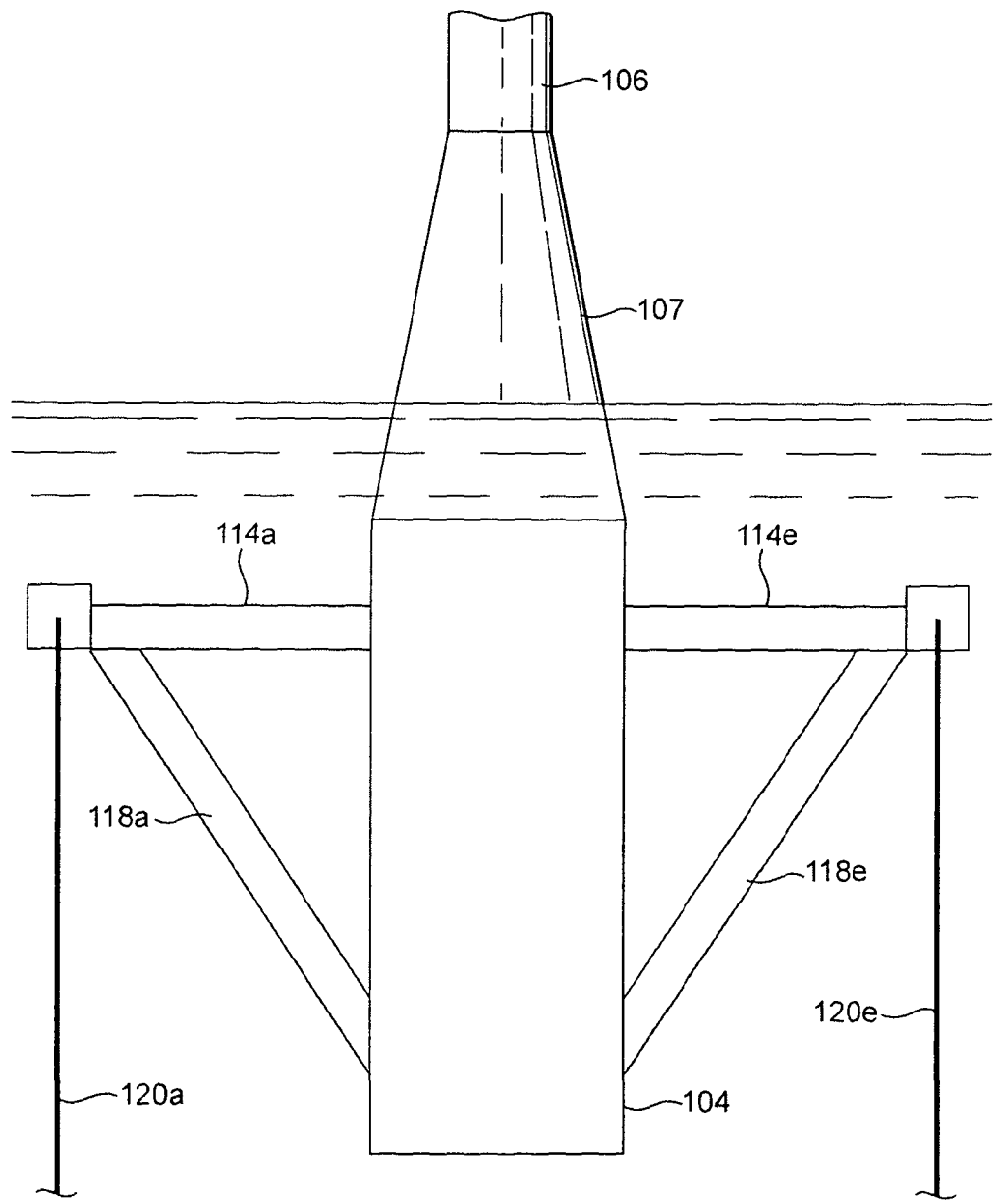
FIG. 4 is a corresponding side elevation of the second embodiment.

Referring now to FIGS. 3 and 4, a structure according to a preferred embodiment of the invention is shown in plan view. Like elements to those of the first embodiment are given like reference numbers. A frustoconical section 107 interconnects the float body 104 and upper column 106. The lower rim of the frustoconical section 107 is at a depth of 6 meters at Lowest Astronomical Tide or 'LAT'. The float body 104 is relatively deep, to provide increased buoyancy. To increase the resistance to hydrostatic pressure due to the greater length of the float body, the underside of the chamber, i.e. its base, may be convexly radiussed or domed. It has a diameter of 13.1 meters and extends in normal use to a depth of 37.5 meters below the water at its centre axis (but at high tide and in high waves the depth may be as high as 45-50 m).

The length of the horizontal outrigger arms 114 from the central body to the tether attachment points at their distal ends is just under 16 meters. The diagonal struts 118 run downwardly and inwardly at an angle of 34 degrees and join the float body 104 at its base. The entire outrigger structure and tether top terminations are maintained well below the trough of the highest expected wave (about 12 m deep at LAT). The main tether loads are taken back into the central body by the diagonal struts 118.

Figure 5:
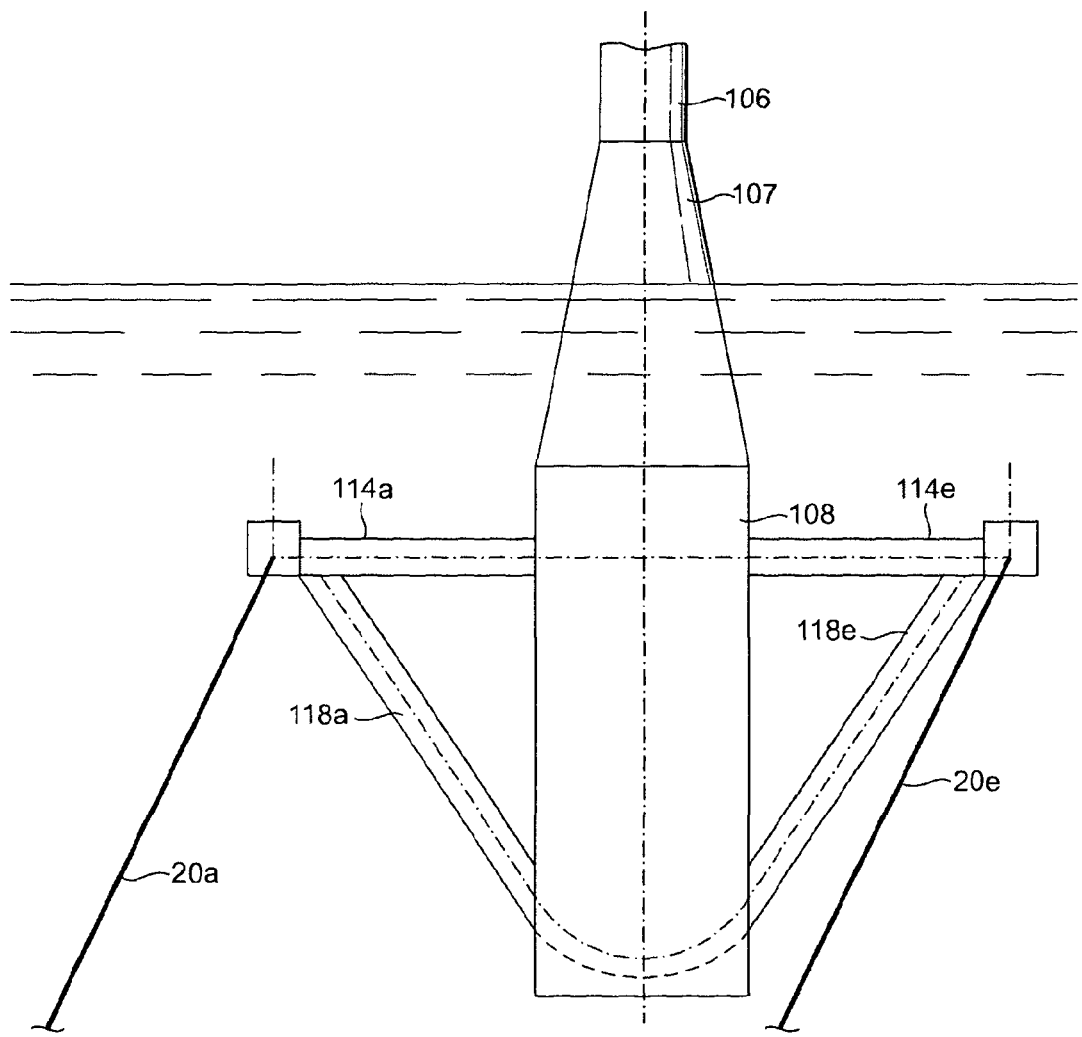
FIG. 5 corresponds to FIG. 4 with the structure at maximum offset.

FIG. 5 shows the preferred embodiment of the invention at an extreme offset due to aligned wind, waves and current. At this point, the lower rim of the frustoconical section 107 is at a depth of 11.6 meters at LAT. It will be seen that the structure can be displaced until the tethers reach an angle of about 26 degrees from the vertical, without any risk of the tethers fouling the structure or the lower side of the float body.

Summary of Dimensions and Draught of Preferred Embodiments

The draught of the embodiments is about 35 meters (in low tide conditions) with the overall centre of gravity of float chamber+tower+nacelle+blades between 25 and 30 m higher—i.e. below the mean water level, allowing for a possible difference in mean sea level due to tide of approximately 7 m. The nacelle is 87 m above mean sea level at low tide and the blade tips are 27 m above sea level at the lowest points of their rotation. The span of the blades is 120 m. The span across the tether attachments varies between 42 m-45 m for a steel central body.

Advantages of the Embodiments

With this new configuration, several things are evident:
1. The moment about the tether centroid due to the wind load at the hub is reduced;
2. The moments about the tether centroid induced by the wave loads on the tower immediately above the tether centroid are counterbalanced by similar loads on the base of the tower and on the structure of the outriggers resulting in a net reduction or even reversal (depending on the dimensions of the floating body and outriggers);
3. The centre of gravity of the mass of the structure (together with the added mass of water moving with it) will be closer to the tether centroid and hence the moments about the tether centroid due to inertial effects will be substantially reduced;
4. Similarly, the loads due to currents will have a centre of pressure close to the tether centroid, reducing the moments due to currents;
5. The tethers are significantly longer than before (since their tops are nearer the top of the floating body) and thus allow the floating body to move in response to the waves;
6. As a result of all of the above,
   a. the net moment about the tether centroid is reduced,
   b. the net load reacted by the tethers is share more evenly among the tethers
   c. the pre-tension applied to the tethers required to prevent them from going slack is also reduced, and
   d. the extreme tether loads are substantially lower in comparison with those predicted for the original configurations of outriggers.
7. Since the net moments about the tether centroid are reduced, the moment arms of the tethers can also be shortened, making the entire structure more compact;
8. Where mooring forces are taken by a seabed counterweight, the size of this counterweight can be substantially reduced by comparison with that required for the prior art design;
9. Since the tether centre is still below the trough of the maximum wave, they and the outrigger arms will not be vulnerable to damage from visiting ships and barges, yet are more easily accessible to divers for repair purposes than in the prior art.

The preferred embodiment, with or without the upper tower, nacelle and blades has been demonstrated to be stable when it is ballasted to float with the top of the outriggers at mean water level. It is anticipated that the entire structure would also be hydrostatically stable when ballasted to float below the final installed draft (to allow tether attachment to be implemented). Between these limits, temporary buoyancy may be required to ensure hydrostatic stability.

Other Variations and Embodiments

Various modifications and substitutions will be apparent to the skilled reader. The tethers 20 are preferably attached near the distal ends of the outrigger arms 14, but it is possible, though less preferred, to attach them to the braces 16 or some other structure towards the distal ends of the outriggers. They may be made of steel or of other materials such as Kevlar™ (supplied under the trade name Parafil™). The outrigger arms 14 do not need to run horizontally in use but could be somewhat inclined, though if they run upwards and inwards the risk of fouling by vessels is raised whereas if they run downwards and inwards the strength of the structure is reduced.

The number of outrigger arms could be 6, 8 or some other convenient number as determined by trial and error. It would also be possible to use lower numbers of arms (such as 3 or 4 arms), in which case it may be convenient to provide additional bracing for each arm (for example by making the arms in a "plated" structure as widely used in platforms and bridges).

Additional braces could be provided to reduce the likelihood of buckling of the diagonal struts 18. Rather than comprising arms the inclined struts 18 could be fins. It would even be possible to provide the entire structure as a solid or hollow "flower-pot" shaped cone, flaring upwardly from the base of the buoyant body.

One tether could be attached to each arm, as disclosed above, or n (n>1), anchored to different points on the anchoring structure 30, could be attached to each. In the latter case, a pair of tethers may be provided to each arm to allow for redundancy in the case of snapping of one of the pair, or higher numbers of tethers per arm may be used in order to share the tensile loads across several tethers and hence allow reduction of the diameter of each tether (for example, with three tethers, each can be designed to take 50% of the load whilst still providing redundancy).

Instead of a steel buoyant body, a hybrid of concrete and steel (as known in the prior art and as shown in FIG. 1), or another material, could be used as in the first embodiment. In this case, the span between tether attachments can be maintained at 45 m (although it could be larger if desired) but the diameter of the central float chamber may increase to between 14 m and 15 m.

It may be convenient, for practical purposes, to provide a flat lower surface rather than a convex one.

Whilst the structure described above has been proposed for use as a wind turbine, it could be deployed with other offshore equipment, although it may be less useful for broader, lower structures. All dimensions, to whatever degree of accuracy quoted, are approximations which could and would be varied in use depending on materials and other parameters used in the embodiments.

All these and any other variants which would be apparent to the reader are intended to be covered by the scope of the present application. Protection is hereby claimed for any and all novel subject matter and combinations thereof whether or not within the scope of the attached claims.

The invention claimed is:

1. A moored floating offshore wind turbine structure comprising:
   a vertically extending central body comprising:
   a columnar hollow tubular flotation chamber, and
   a cylindrical tubular tower coaxial with and supported by said columnar hollow tubular flotation chamber;
   an outrigger structure comprising a plurality of outrigger arms extending radially from said body, the distal ends of which are interconnected by a ring of horizontal braces, and attachment points spaced radially outwardly from said central body, said attachment points disposed in a plane; and
   an inclined bracing structure comprising a plurality of inclined bracing struts running from a distal part of said outrigger structure to connect with said central body, said inclined bracing structure running diagonally downwardly and inwardly from the plane of said attachment points, a proximal part of said inclined bracing structure joining said central body near its lower end; and
   tensioned mooring tethers connected to said attachment points, said tensioned mooring tethers acting to pull the bracing struts downwards and therefore maintain them in compression and the outrigger arms in tension.

2. The structure of claim 1, wherein said outrigger structure runs substantially perpendicular to an axis of said central body.

3. The structure of claim 2, wherein the underside of said columnar hollow tubular flotation chamber is convexly domed.

4. The structure of claim 3, wherein said columnar hollow tubular flotation chamber is formed of metal.

5. The structure of claim 4, wherein a proximal part of said outrigger structure joins said central body at a location below a normal trough level of waves when the structure is deployed.

6. The structure of claim 1, wherein the underside of said columnar hollow tubular flotation chamber is convexly domed.

7. The structure of claim 1, wherein said columnar hollow tubular flotation chamber is formed of metal.

8. The structure of claim 1, wherein a proximal part of said outrigger structure joins said central body at a location below a normal trough level of waves when the structure is deployed.

9. A support structure for an offshore wind turbine, said structure comprising:
   a central body for mounting said offshore wind turbine, said central body comprising
   a cylindrical tubular tower, and
   a columnar hollow tubular flotation chamber supporting and coaxial with said cylindrical tubular tower;
   an outrigger structure comprising a plurality of outriggers arms extending substantially horizontally and outwardly from said columnar hollow tubular flotation chamber, wherein the distal ends of said outrigger arms are interconnected by a ring of horizontal braces, said outrigger structure including attachment points radially spaced around said columnar hollow tubular flotation chamber;
   tethers connected to said attachment points and to a floor of a body of water, said outrigger structure loaded normally in tension by said tethers; and
   a bracing structure comprising a plurality of inclined bracing struts that run diagonally outwardly and upwardly from a lower portion of said columnar hollow tubular flotation chamber to a distal portion of said outrigger structure, and are loaded normally in compression by said tethers.

10. The structure of claim 9, wherein the underside of said columnar hollow tubular flotation chamber is convexly domed.

11. The structure of claim 9, wherein said columnar hollow tubular flotation chamber is formed of metal.

12. A method of operating a wind turbine, said method comprising mounting said offshore wind turbine atop a floating body comprising a cylindrical tubular tower coaxial with and supported by a columnar hollow tubular flotation chamber, tethered to the floor of a body of water by a plurality of tethers, each attached to a respective attachment point radially spaced around said floating body and provided by an outrigger structure comprising a plurality of outrigger arms extending substantially horizontally and loaded normally in tension by said tethers, said outrigger arms being interconnected, at distal ends thereof, by a ring of horizontal braces and braced by a bracing structure comprising a plurality of inclined bracing struts running diagonally outwardly and upwardly and loaded normally in compression by said tethers.

13. The method of claim 12, wherein a proximal part of said outrigger structure joins said floating body at a location below a normal trough level of waves.

* * * * *